(12) United States Patent
Chiu

(10) Patent No.: US 11,213,102 B1
(45) Date of Patent: Jan. 4, 2022

(54) BUCKLE DEVICE

(71) Applicant: BROGENT TECHNOLOGIES INC., Kaohsiung (TW)

(72) Inventor: Shih-Kuang Chiu, Kaohsiung (TW)

(73) Assignee: BROGENT TECHNOLOGIES INC., Kaohsiung (TW)

(*) Notice: Subject to any disclaimer, the term of this patent is extended or adjusted under 35 U.S.C. 154(b) by 0 days.

(21) Appl. No.: 17/030,574

(22) Filed: Sep. 24, 2020

(51) Int. Cl.
*B60R 22/48* (2006.01)
*A44B 11/26* (2006.01)
*A44B 11/25* (2006.01)
*E05B 47/00* (2006.01)

(52) U.S. Cl.
CPC .......... *A44B 11/263* (2013.01); *A44B 11/2523* (2013.01); *E05B 47/0004* (2013.01); *E05B 2047/0007* (2013.01); *Y10T 24/45623* (2015.01)

(58) Field of Classification Search
CPC .............. A44B 11/263; A44B 11/2523; A44B 11/2507; Y10T 24/45958; Y10T 24/45785; Y10T 24/45775; Y10T 24/45665; Y10T 24/4566; Y10T 24/45623; Y10T 24/45602; Y10T 24/45257; Y10T 24/45251; Y10T 24/45241; Y10T 24/407
See application file for complete search history.

(56) References Cited

U.S. PATENT DOCUMENTS

| | | | |
|---|---|---|---|
| 5,781,971 A * | 7/1998 | Petersen, III ...... | A44B 11/2523 24/633 |
| 6,357,091 B1 * | 3/2002 | Devereaux ............. | B60R 22/48 24/303 |
| 6,389,661 B1 * | 5/2002 | Brown ................... | B60R 22/48 24/633 |
| 6,474,435 B1 * | 11/2002 | Devereaux ............. | B60R 22/48 180/270 |
| 2012/0144630 A1 * | 6/2012 | Nimura .............. | A44B 11/2523 24/593.1 |

FOREIGN PATENT DOCUMENTS

TW    I684541 B    2/2020

* cited by examiner

*Primary Examiner* — Robert Sandy
*Assistant Examiner* — Michael S Lee
(74) *Attorney, Agent, or Firm* — Muncy, Geissler, Olds & Lowe, P.C.

(57) ABSTRACT

A buckle device comprises a main body unit, a latch unit and a fastening unit. The main body unit includes a housing surrounding and defining an accommodating space, two first apertures provided in the housing, two slider blocks arranged in the accommodating space, and two first elastic bodies abutting against the slider blocks. The latch unit includes a tongue element and two tongue openings provided on the tongue element. The fastening unit includes two bolt bodies passing through the first apertures, and two second elastic bodies abutting against the bolt bodies. When the tongue element is separated from the two slider blocks, the two slider blocks are pushed by the two first elastic bodies, and the two bolt bodies is pushed against by the two slider blocks. When the tongue element is in contact with the two slider blocks, the two slider blocks are pushed by the tongue element, and the two bolt bodies are pushed into the two tongue openings by the two second elastic bodies, so that the tongue element can be securely fastened. Accordingly, the external pulling force of the tongue element can be increased, and the structure of the buckle device can be effectively improved.

9 Claims, 10 Drawing Sheets

BUCKLE DEVICE

BACKGROUND OF THE INVENTION

1. Field of the Invention

The application relates to a buckle device. More particularly, the application relates to a buckle device provided with double protection using remote electronic signals to prevent the buckle device from accidental release.

2. Description of the Prior Art

The current amusement facilities provide the haptic feedback through a series actions like moving or rotating the seats. Seat belts will be installed on the seats to keep the occupants safe. Furthermore, the seats will be provided with a fastening structure using plates and latches to fix the occupants on the seats, and prevent accidental occurrences during operation, so that the occupants can safely stick to the seat to feel the haptic feedback produced by the seats' motions.

Referring to FIG. 1, Taiwanese Patent No. I684541, which relates to a buckle device 10 that can provide a latch plate device 11 for insertion. The buckle device 10 includes two vertical disks 101, a press body 102, and two electromagnetic rods 103, two first springs 104 arranged between the two vertical disks 101 and the press body 102, two second springs 105 respectively arranged on the two electromagnetic rods 103, and two detectors 106 for detecting the two electromagnetic rods 103.

The vertical disks 101 can interfere with the latch plate device 11 to fasten the latch plate device 11 in the buckle device 10. After the press body 102 is pressed, the vertical disks 101 can be released from the locked state, so that the vertical disks 101 are pushed by the first springs 104 and meanwhile, the latch plate device 11 is pushed outward.

The second springs 105 are designed to push the electromagnetic rods 103 into the vertical disks 101, so that the vertical disks 101 can be fastened. Even if the press body 102 is pressed, the vertical disks 101 cannot move. Therefore, the press body 102 can release the locked state occurred between the vertical disks 101 and the latch plate device 11 only when the electromagnetic rods 103 are separated from the vertical disks 101.

Although the prior art discloses a buckle device, it still has the following shortcomings in actual use:

1. Complex structure
   The conventional vertical disk has a complex structure provided with multiple grooves and protrusions for accommodating springs or fastening structures, and cannot be assembled step by step. The operators need to depend on the actual situation to install the relevant components in the buckle device, and overcomes the elastic force generated by the spring structure, or the undefined fastening position condition caused by the rotation, so the structure is complex and difficult to assemble.
2. Unable to prevent the press body from being pressed
   After the conventional electromagnetic rods interfere with the vertical disks, the press body can still be pressed. Although the vertical disks are unable to move due to the electromagnetic rods, the press body can be pressed which will cause the occupant uneasiness.
3. Lack of endurable structure
   The vertical disks are set in the middle of the buckle device by rotating shafts. Since the rotating shafts are connected to the two arms of the vertical disks and long, the rotating shafts are easily deformed due to external forces. Furthermore, the vertical disks are directly fastened by the electromagnetic rods, so the pulling force of the latch plate device is obviously insufficient. Besides, there are multiple protrusions on the vertical disks to interfere with other structures and limit the angle of rotation. The multiple protrusions are tiny to wear out. When the vertical disks are worn, accident is easy to happen.

Therefore, how to modify the structure to speed up the installation time, and to have a stronger structure to enhance the durability, and furthermore to maintain the proper function of the buckle device is an urgent objective for the relevant technical personnel.

SUMMARY OF THE INVENTION

One object of the invention is to provide a buckle device comprising a main unit, a latch unit and a fastening unit.

The main body unit includes a housing surrounding and defining an accommodating space, at least one first aperture provided in the housing, at least one slider block arranged in the accommodating space, and at least one first elastic body abutting against the slider block.

The latch unit includes a tongue element detachably arranged in the accommodating space and detachably abutting against the slider block, and at least one tongue opening provided on the tongue element.

The fastening unit includes at least one bolt body passing through the first aperture, and at least one second elastic body abutting against the bolt body.

When the tongue element is separated from the slider block, the slider block is pushed by the first elastic body, so that the bolt body is pushed against by the slider block, and the bolt body is prevented from entering the accommodating space. When the tongue element in contact with the slider block, the slider block is pushed by tongue element, and the bolt body is pushed by the second elastic body to enter the tongue opening, so that the tongue element is securely fastened Another technique of an embodiment of the invention is that the main unit further includes at least one second aperture provided in the housing and spaced apart from the first aperture, and when the bolt body is pushed into the tongue opening by the second elastic body, the bolt body passes through the second aperture.

Another technique of an embodiment of the invention is the buckle device of the invention further comprises a press unit that includes a press body provided in the housing, and a third elastic body abutting against the press body. The press body is shifted between a first position and a second position. When the bolt body is pushed against by the slider block, the press body is pushed by the third elastic body to the first position and is spaced apart from the bolt body. When the bolt body enters the tongue opening, the bolt body is connected to the press body, and the press body is shifted to the second position when being pressed, so that the bolt body is able to move.

Another technique of an embodiment of the invention is that the press unit further includes at least one angled support surface disposed on the press body. When the bolt body enters the accommodating space, the bolt body is connected to the angled support surface. When the press body is pressed, the press body is shifted from the first position to the second position, and the bolt body is removed from the tongue opening by the angled support surface.

Another technique of an embodiment of the invention is that the buckle device of the invention comprises an electromagnetic unit that includes at least one electromagnetic module disposed in the housing, at least one electromagnetic rod passing through the electromagnetic module, and at least one fourth elastic body abutting against the electromagnetic rod. The electromagnetic rod is shifted between a third position and a fourth position, and the electromagnetic rod is located at the third position when the electromagnetic module is excited, so that the electromagnetic rod is spaced apart from the bolt body. When the bolt body enters the accommodating space and the electromagnetic module is not excited, the electromagnetic rod is pushed by the fourth elastic body to the fourth position, and the electromagnetic rod interferes with the bolt body to prevent the bolt body from leaving the accommodating space.

Another technique of an embodiment of the invention is that the buckle device of the invention further comprises a control unit that includes at least one detection module disposed in the housing for detecting the position of the electromagnetic rod, and a control module electrically connected to the detection module and the electromagnetic module.

Another technique of an embodiment of the invention is that the fastening unit further includes at least one fastening guide body connected to the bolt body. The fastening guide body has two side walls connected to the housing, two guiding parts respectively arranged on the two side walls, and a top wall connected to the two side walls.

Another technique of an embodiment of the invention is that the bolt body has a fastening part arranged in the first aperture and capable of extending into the accommodating space, a protruding part connected to the fastening part, and two wings separately arranged on both sides of the protruding part and separately passing through the wings of the two guiding parts.

Another technique of an embodiment of the invention is that the housing has a first plate, a second plate spaced apart from the first plate, and two third plates spaced apart from each other and connected to the first plate and the second plate. The first plate, the second plate, and the two third plates cooperate to define the accommodating space. The first aperture is provided on the first plate, and the second aperture is provided on the second plate. The press body is arranged among the first plate, the two third plates and the fourth plate, and the electromagnetic module is arranged in the electromagnetic fixing part.

Another technique of an embodiment of the invention is that the distance between the first plate and the second plate fits in with the thickness of the tongue element and the slider block, so that the first plate and the second plate are able to clamp the tongue element and the slider block. The tongue element and the slider block are able to slide stably in the accommodating space, and the bolt body is pressed against by the tongue element and one of the slider blocks to prevent the bolt body from entering the accommodating space.

The advantage of the embodiments of this invention is that when the bolt body leaves the tongue opening of the latch unit, the slider block is pushed by the first elastic body to move the tongue element, and release the locked state of the buckle device. The slider block cooperates with the tongue element to alternately support the bolt body and prevent the bolt body from entering the accommodating space. When the tongue element is inserted into the accommodating space, the tongue element can push the slider block and make the bolt body extend into the tongue opening, so that the bolt body interferes with the tongue element to prevent the tongue element from leaving the accommodating space. The first aperture cooperates with the second aperture to push against the bolt body, which can increase the external pulling force of the tongue element, and effectively enhance the structural strength of the buckle device.

DETAILED DESCRIPTION OF THE PREFERRED EMBODIMENTS

Figure 1:
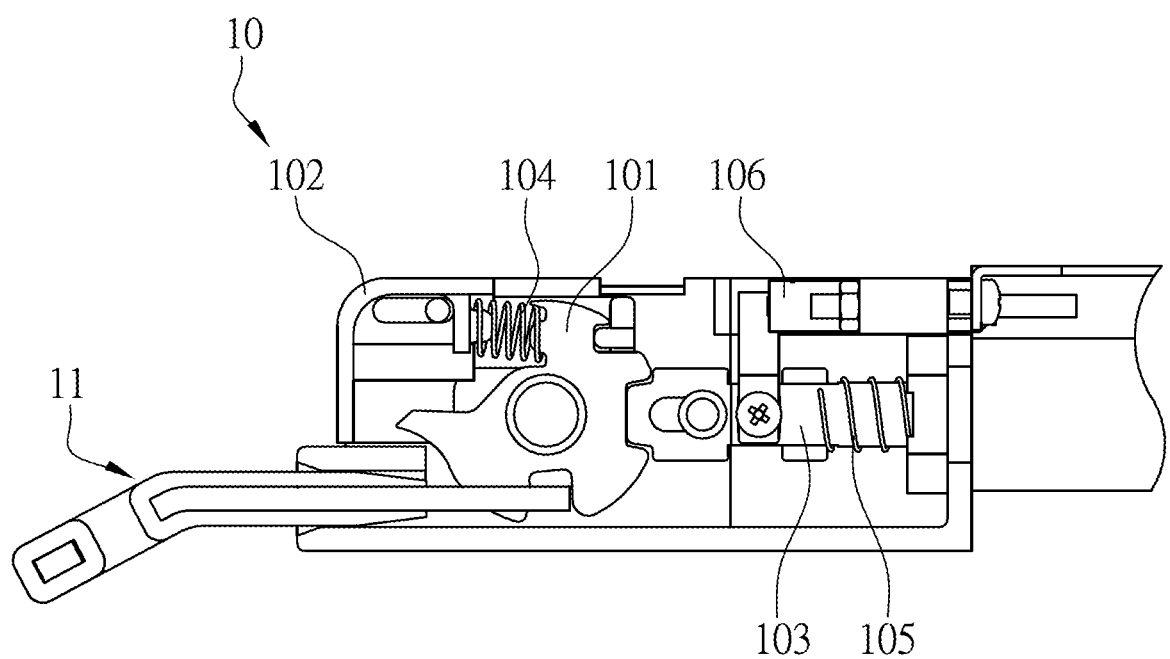
FIG. 1 shows a schematic side view of a buckle device using the vertical disks of Taiwanese Patent No. I684541.

Specific structural and functional details disclosed herein will become apparent from the following description of the exemplary embodiments of the invention taken in conjunction with the accompanying drawings, which provides a better understanding to a person having ordinary skill in the art but shall not be construed as limiting the invention. Wherever possible, the same reference numbers are used in the drawings and the description to refer to the same or like parts.

Figure 3:
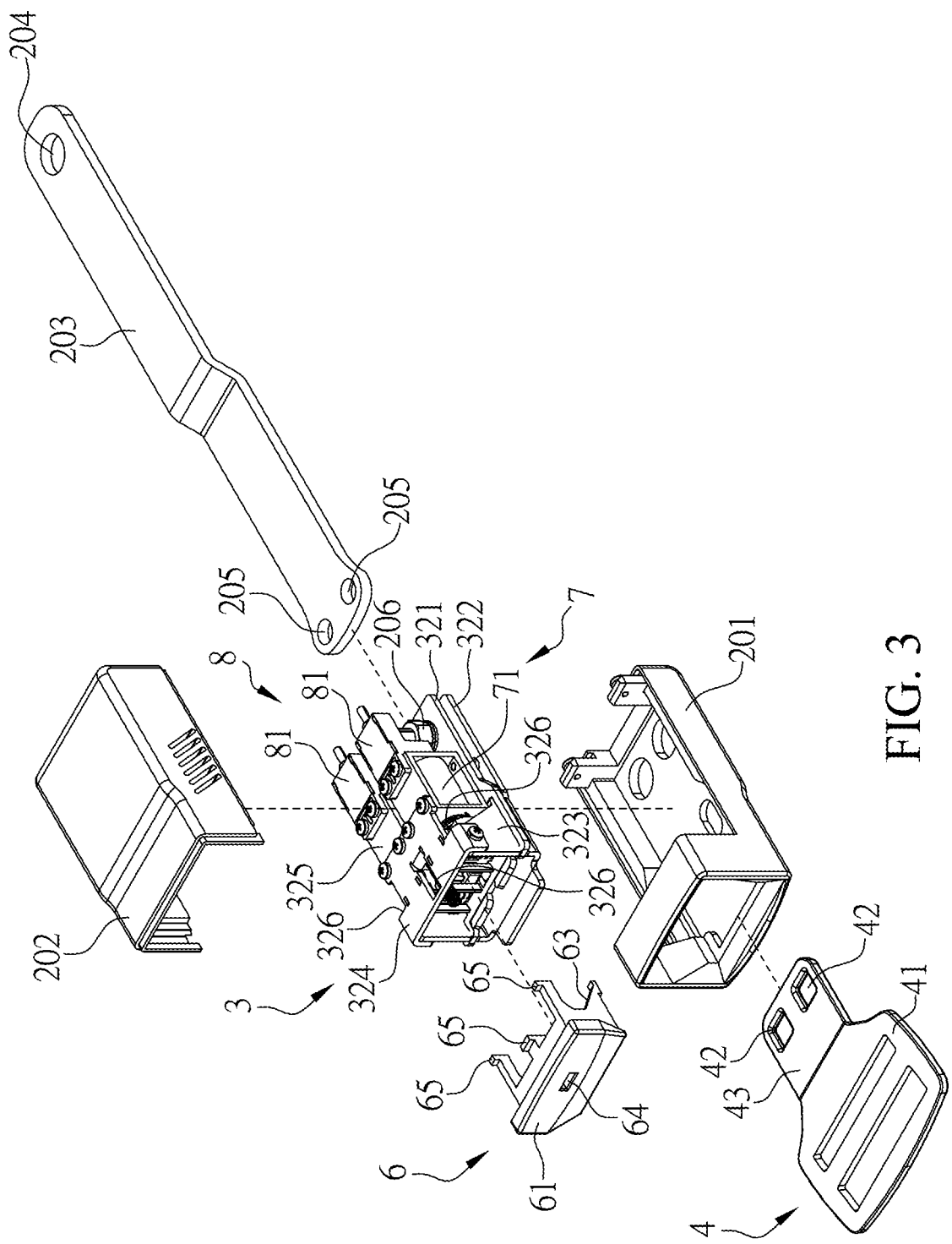
FIG. 3 shows a perspective exploded view of the buckle device, according to certain embodiments.
Figure 4:
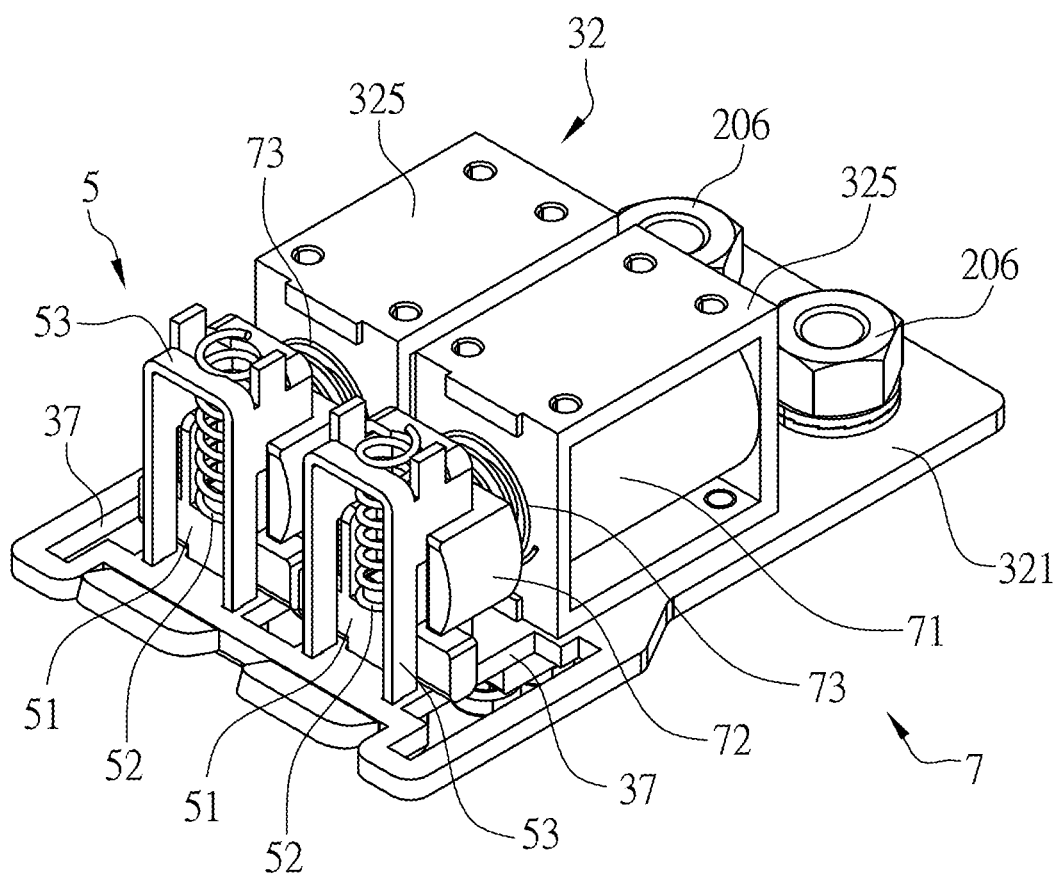
FIG. 4 shows a perspective view of a fastening unit and an electromagnetic unit arranged on a first plate, according to certain embodiments.

Referring to FIGS. 3 and 4, an embodiment of a buckle device of the invention, comprises a main unit 3, a latch unit 4, a fastening unit 5, a press unit 6, an electromagnetic unit 7 and a control unit 8.

Figure 2:
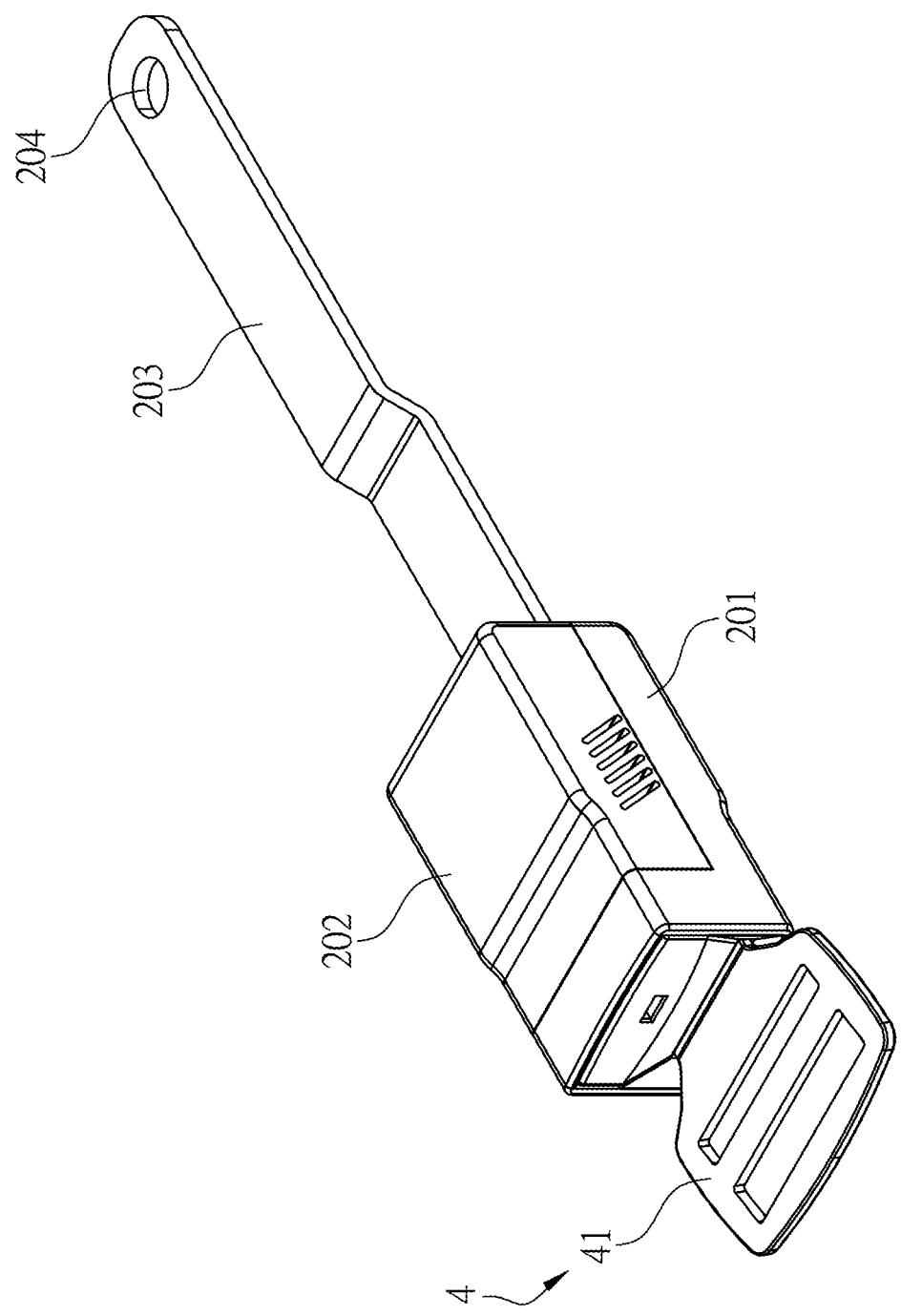
FIG. 2 shows a perspective view of a buckle device, according to certain embodiments.

Referring to FIG. 2, the buckle device is disposed between a first outside casing 201 and a second outside casing 202. The first outside casing 201 and the second outside casing 202 are designed to protect the buckle device, which can prevent the mechanical structure of the buckle device from external forces, and can also prevent the buckle device from hurting the occupants.

Referring to FIG. 3, the buckle device is connected to a mount extender 203, and the mount extender 203 is provided with a mounting hole 204 and two locking holes 205. The two locking holes 205 can be passed through by the two locking components 206, so that the buckle device can be fastened with the mount extender 203.

The mount extender 203 is fixed by the mounting hole 204 on a seat (not shown), so the buckle device can be arranged on the seat, and a belt body (not shown) can be also used to fix a person (not shown) on the seat. The seat is set on the amusement device, and the amusement device will move the seat, so that the belt body and the buckle device are combined to become a safety belt and secure the occupants sitting in the seat. Since the amusement device provided with the seat belts is a common technique, it will not be detailed hereinafter.

Figure 9:
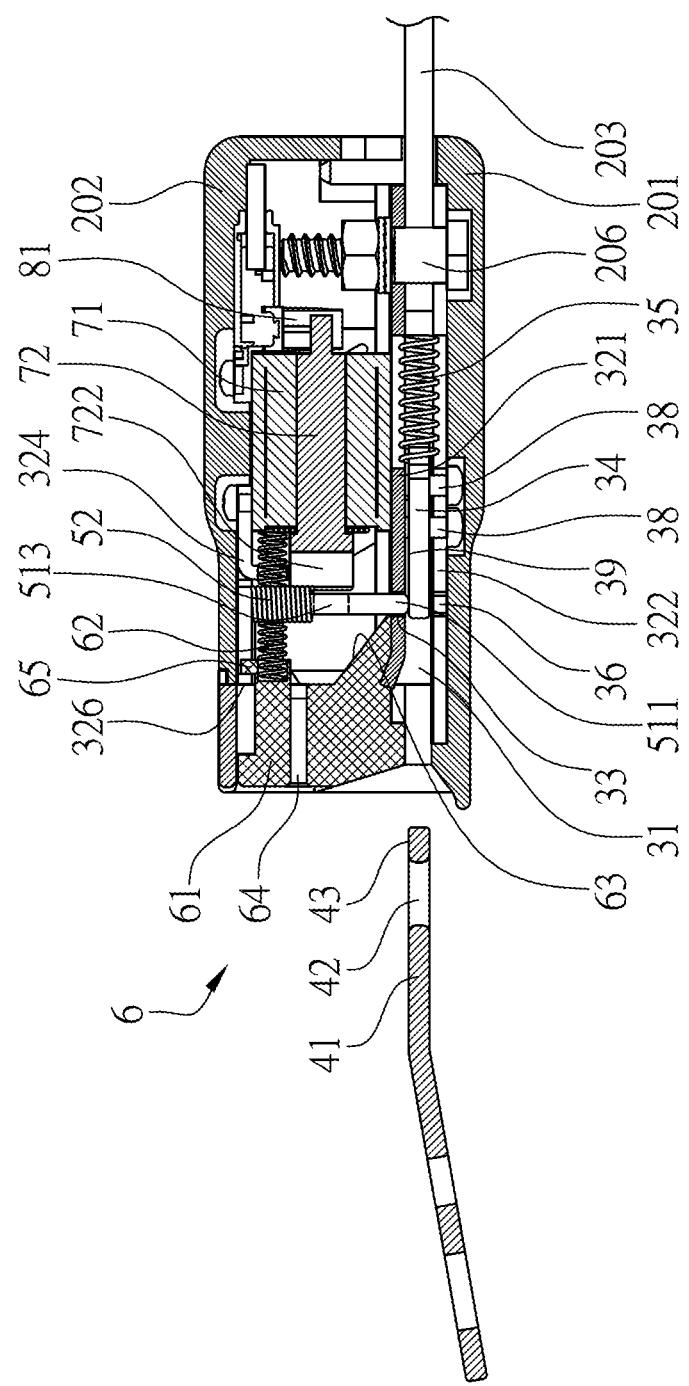
FIG. 9 shows a schematic side view of a latch unit separated from the main unit, according to certain embodiments.

Referring to FIGS. 4 and 9, the main body 3 unit includes a housing 32 surrounding and defining an accommodating space 31, two first apertures 33 provided in the housing 32, two slider blocks 34 arranged in the accommodating space 31, two first elastic bodies abutting against the slider blocks 34, two second apertures 36 provided in the housing 32, two plate perforations provided in the housing 32, and two sliding guide bodies passing through the accommodating space 31.

Referring to FIG. 3, the housing 32 has a first plate 321, a second plate 322 spaced apart from the first plate 321, two third plates 323 spaced apart from each other and connected to the first plate 321 and the second plate 322, a fourth plate 324 connected to the two third plates 323 and spaced apart from the first plate 321, two electromagnetic fixing portions 325 provided on the first plate 321, and a plurality of the stopper portions 326 provided on the fourth plate 324.

Referring to FIG. 9, the first plate 321, the second plate 322, and the two third plates 323 cooperate to define the accommodating space 31. The two first apertures 33 are provided on the first plate 321, and the two second apertures 36 are provided on the second plate 322.

The two third plates 323 and the second plate 322 are the same metal plate, and are bent by mental stamping, so that the two third plates 323 are erected on two sides of the second plate 322. The two plate perforations 37 are arranged on the first plate 321 at intervals, and the two third plates 323 respectively pass through the two plate perforations 37 and stand on two sides of the first plate 321. The fourth plate 324 is disposed on the top of the two third plates 323 and connected to the two third plates 323. The first plate 321 is spaced apart from and the fourth plate 324 each other. The two electromagnetic fixing portions 325 and the fourth plate 324 are connected together.

The mount extender 203 is sandwiched between the first plate 321 and the second plate 322. The first plate 321, the mount extender 203, and the second plate 322 are fixed together with the two locking components 206. The distance between the first plate 321 and the second plate 322 is the height of the accommodating space 31, and the thickness of the two slider blocks 34 fits in with the height of the accommodating space 31, so that the two slider blocks 34 can slide in the accommodating space 31.

The two sliding guide bodies 38 are two screws that are fastened on the second plate 322 and protrude from the accommodating space 31. The two slider blocks 34 have perforations, and the two sliding guide bodies 38 respectively pass through the perforations on the two slider blocks 34, so that the position of the two slider blocks 34 in the accommodating space 31 can be limited.

The latch unit 4 includes a tongue element 41 detachably arranged in the accommodating space 31, two tongue openings 42 provided on the tongue element 41, and a second surface 43 disposed on the tongue element 41 and facing the first plate 321.

The distance between the first plate 321 and the second plate 322 is the height of the accommodating space 31, and the thickness of the tongue element 41 fits in with the height of the accommodating space 31, so that the tongue element 41 can slide in the accommodating space 31. The left side of the accommodating space 31 communicates with the outside, so the tongue element 41 can be inserted into the accommodating space 31 from the outside, and the tongue element 41 can also leave the accommodating space 31.

The upper surface of each of the slider blocks 34 is defined as a first surface 39, and the two first surfaces 39 face the first plate 321 respectively. Since the thickness of the two slider blocks 34 and the tongue element 41 fits in with the height of the accommodating space 31, the two first surfaces 39 will be the same height as the second surface 43.

Figure 10:
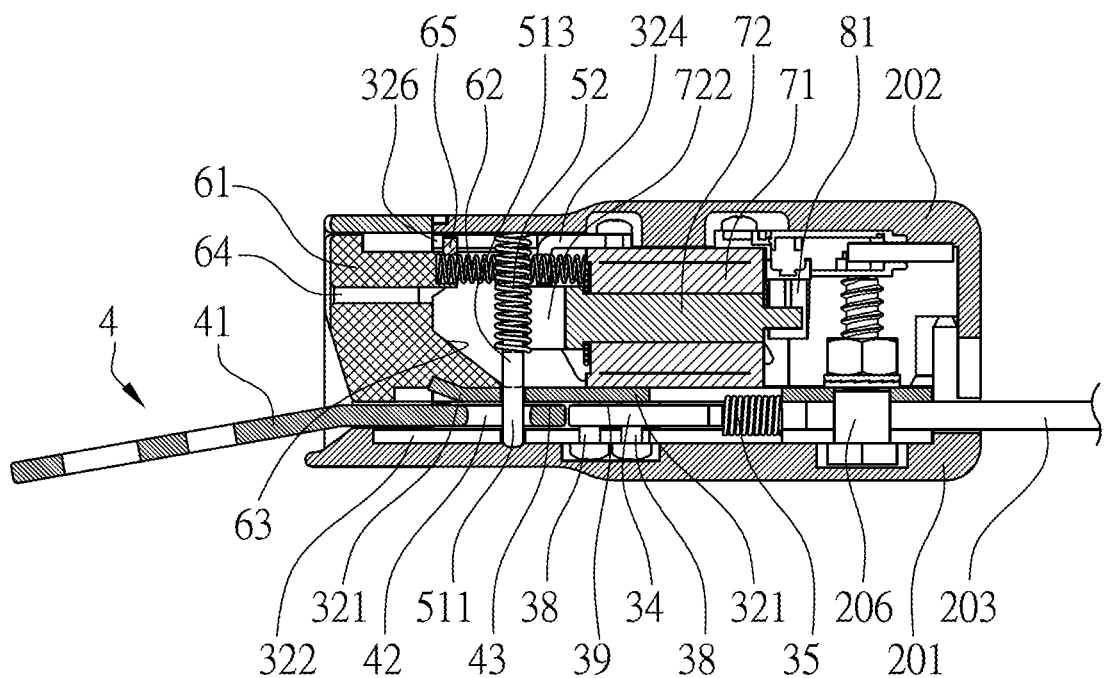
FIG. 10 shows a schematic side view of the latch unit inserting to the main unit, according to certain embodiments.

Referring to FIGS. 9 and 10, in the embodiment, the vertical height of the two first elastic bodies 35 is greater than the vertical height of the accommodating space 31, and the first plate 321 and the second plate 322 are respectively provided with two openings for fixing the two first elastic bodies 35. The shape of the plurality of openings is rectangular, and the length of the plurality of openings is equal to the length of the two first elastic bodies 35. The width of the plurality of openings is smaller than the width of the two first elastic bodies 35, so that the first plate 321 and the second plate 322 on the sides of the openings can fix the upper and lower sides of the two first elastic bodies 35. The right side of the two first elastic bodies 35 is pushed against by the first plate 321 and the second plate 322 disposed on the right side of the plurality of openings, and the left side of the two first elastic bodies 35 abuts against the right side of the two slider blocks 34 respectively. Therefore, the two slider blocks 34 can be pushed and slide to the left in the accommodating space 31 by the two first elastic bodies 35. Alternatively, the two slider blocks 34 can be pushed and slide to the right in the accommodating space 31 under the external force which enables the two first elastic bodies 35 to compress. In actual implementation, the two first elastic bodies 35 can be fixed by other structures, and should not be construed as limiting the invention.

Referring to FIG. 4, the fastening unit 5 includes two bolt bodies 51 arranged in the two first apertures 33, two second elastic bodies 52 connected to the two bolt bodies 51, and two fastening guide bodies 53 connected to the bolt bodies 51.

Figure 6:
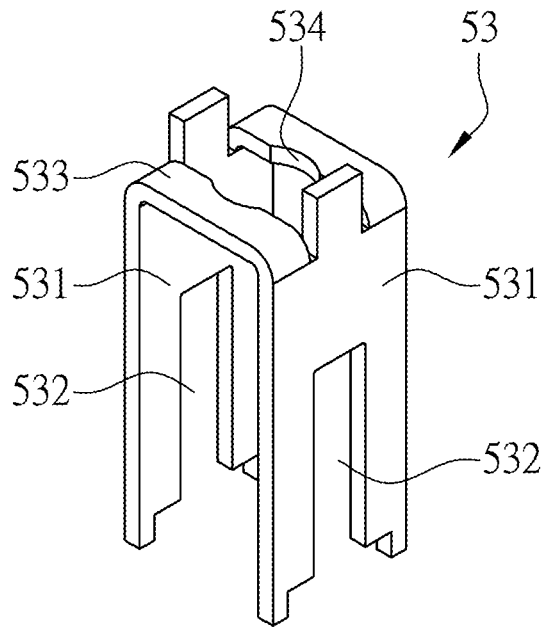
FIG. 6 shows a perspective view of a fastening guide body of the fastening unit, according to certain embodiments.

Referring to FIG. 6, the two fastening guide bodies 53 respectively have two side walls 531 connected to the first plate 321, two guiding parts 532 respectively provided on the two side walls 531, a top wall 533 connected to the two side walls 531, and a spring opening 534 provided on the top wall 533.

Figure 5:
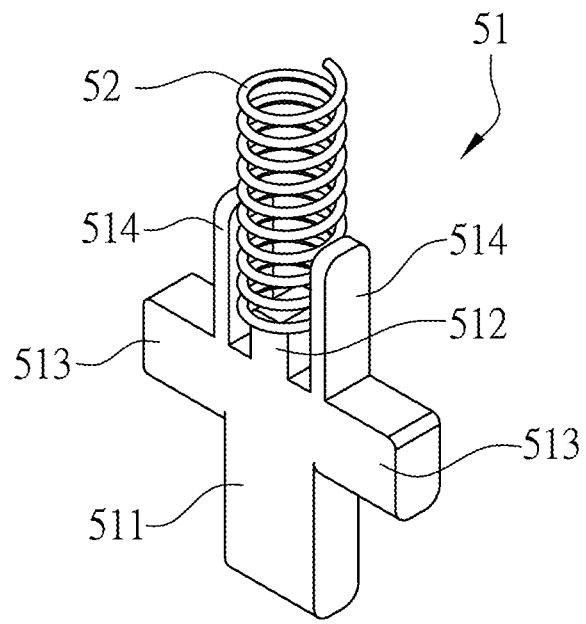
FIG. 5 shows a perspective view of a bolt body of the fastening unit, according to certain embodiments.

Referring to FIGS. 5 and 6, each of the bolt bodies 51 has a fastening part 511 that is disposed in the first aperture 33 and can extend into the accommodating space 31 and the second apertures 36, a protruding part 512 connected to the fastening part 511 and disposed between the two side walls 531, two wings 513 connected to the protruding part 512 and protruding outward from the two guiding parts 532 respectively, and two side stoppers 514 disposed on the two sides of the protruding part 512. The protruding part 512 is configured to accommodate the second elastic body 52, and the two side stoppers 514 are designed to maintain the second elastic body 52 and prevent the second elastic body 52 from colliding with other spring structures.

The spring opening 534 is designed to allow the second elastic body 52 to pass through, and that the installation of the second elastic body 52 can be simplified. The fourth plate 324 is pushed against by the top end of the second elastic body 52. The bottom end of the second elastic body 52 is sleeved with the protruding part 512, so that the bolt bodies 51 are pushed downward by the second elastic body 52.

Referring to FIG. 9, when the tongue element 41 is separated from the two slider blocks 34, the two slider blocks 34 are pushed by the two first elastic bodies 35, so that the two slider blocks 34 are respectively located below the two first apertures 33, and each of the first surfaces 39 on the two slider blocks 34 are pushed against the bottom end of the fastening parts 511 of the two bolt bodies 51. Therefore, the fastening parts 511 of the two bolt bodies 51 can be prevented from entering the accommodating space 31.

Referring to FIG. 10, when the tongue element 41 is in contact with the two slider blocks 34, the tongue element 41 can be pushed by an external force and move the two slider blocks 34, so that the two slider blocks 34 leave the place below the two first apertures 33. In the meantime, the fastening parts 511 of the two bolt bodies 51 are pushed into the accommodating space 31 by the two second elastic bodies 52, and the fastening parts 511 of the two bolt bodies 51 pass through the two tongue openings 42 of the tongue element 41. Therefore, the two bolt bodies 51 interfere with the tongue element 41 to prevent the tongue element 41 from leaving the accommodating space 31.

The mount extender 203 is sandwiched between the first plate 321 and the second plate 322, and the distance between the first plate 321 and the second plate 322 is defined by the thickness of the mount extender 203. Therefore, the thickness of the accommodating space 31 is the same as the thickness of the mount extender 203, and the thickness of the tongue element 41 and the two slider blocks 34 fits in with the distance between the first plate 321 and the second plate 322, so the tongue element 41 and the two slider blocks 34 can slide stably in the horizontal direction in the accommodating space 31. For example, the thickness of the tongue element 41 and the two slider blocks 34 are equal, and the thickness of the tongue element 41 and the slider blocks 34 is less than the distance between the first plate 321 and the second plate 322. The bottom surface of the first plate 321 and the top surface of the second plate 322 can clamp the tongue element 41 and the two slider blocks 34. In actual implementation, the distance between the first plate 321 and the second plate 322, or the thickness of the tongue element 41 and the two slider blocks 34 should be set based on the actual mechanical structure, and should not be construed as limiting the invention.

The first plate 321 and the second plate 322 can clamp the two slider blocks 34, so that the two slider blocks 34 can slide stably in the accommodating space 31. When the tongue element 41 enters the accommodating space 31, the first plate 321 and the second plate 322 can clamp the tongue element 41, so that the tongue element 41 can slide stably in the accommodating space 31.

When the tongue element 41 abuts against the two slider blocks 34 and both of them slide in the accommodating space 31, and the two bolt bodies 51 are alternately pushed against by either the tongue element 41 or the two slider blocks 34. Therefore, the two bolt bodies 51 enter the accommodating space 31 and extend into the two second apertures 36 only when extending into the two tongue openings 42. Otherwise, the two bolt bodies 51 are pushed against by the tongue element 41 and the two slider blocks 34, and cannot enter the accommodating space 31.

For example, when the tongue element 41 enters the accommodating space 31, it abuts against the two slider blocks 34 and is pushed by an external force. The two slider blocks 34 are pushed away from the sides of the two first apertures 33 by the tongue element 41, and the tongue element 41 will follow to the sides of the two first apertures 33. Then, while the tongue element 41 and the two slider blocks 34 slide in the accommodating space 31, the two bolt bodies 51 will slide from on the first surfaces 39 of the two slider blocks 34 to the second surface 43 of the tongue element 41, so that the tongue element 41 is pushed against the two bolt bodies 51 and prevent the two bolt bodies 51 from entering the accommodating space 31. When the two tongue openings 42 didn't reach the sides of the two first apertures 33 and the external force applied to the tongue element 41 is released, the two slider blocks 34 and the tongue element 41 are pushed by the two first elastic bodies 35. Therefore, the tongue element 41 is pushed away from the sides of the two first apertures 33, and the two slider blocks 34 will follow to the sides of the two first apertures 33. Then, while the tongue element 41 and the two slider blocks 34 slide in the accommodating space 31, the two bolt bodies 51 is pushed against will slide from on the second surface 43 of the tongue element 41 to the first surfaces 39 of the two slider blocks 34, so that two bolt bodies 51 are pushed against by the two slider blocks 34 to prevent the two bolt bodies 51 from entering the accommodating space 31.

It is worth mentioning that the two first apertures 33 are provided on the first plate 321, the two second apertures 36 are provided on the second plate 322, and the position of the two second apertures 36 correspond to the two first apertures 33. When the fastening parts 511 of the two bolt bodies 51 enter the accommodating space 31, the fastening parts 511 will pass through the two tongue openings 42, and further through the two second apertures 36.

The fastening parts 511 of the two bolt bodies 51 respectively pass through the two first apertures 33 and the two second apertures 36. With the supporting force provided by the two first apertures 33 and the two second apertures 36, the fastening parts 511 of the two bolt bodies 51 can push against the two tongue openings 42 of the tongue element 41. Therefore, the lateral pulling force of the latch unit 4 can be effectively resisted, and the structural strength of the buckle device can be enhanced.

Referring to FIGS. 3 and 9, the press unit 6 includes a press body 61 disposed among the first plate 321, the two third plates 323, and the fourth plate 324, a third elastic body 62 connected to the press body 61, two angled support surfaces 63 arranged on the press body 61, a release hole 64 provided on the press body 61, and multiple limiting convex bodies 65 arranged on the press body 61.

Figure 12:
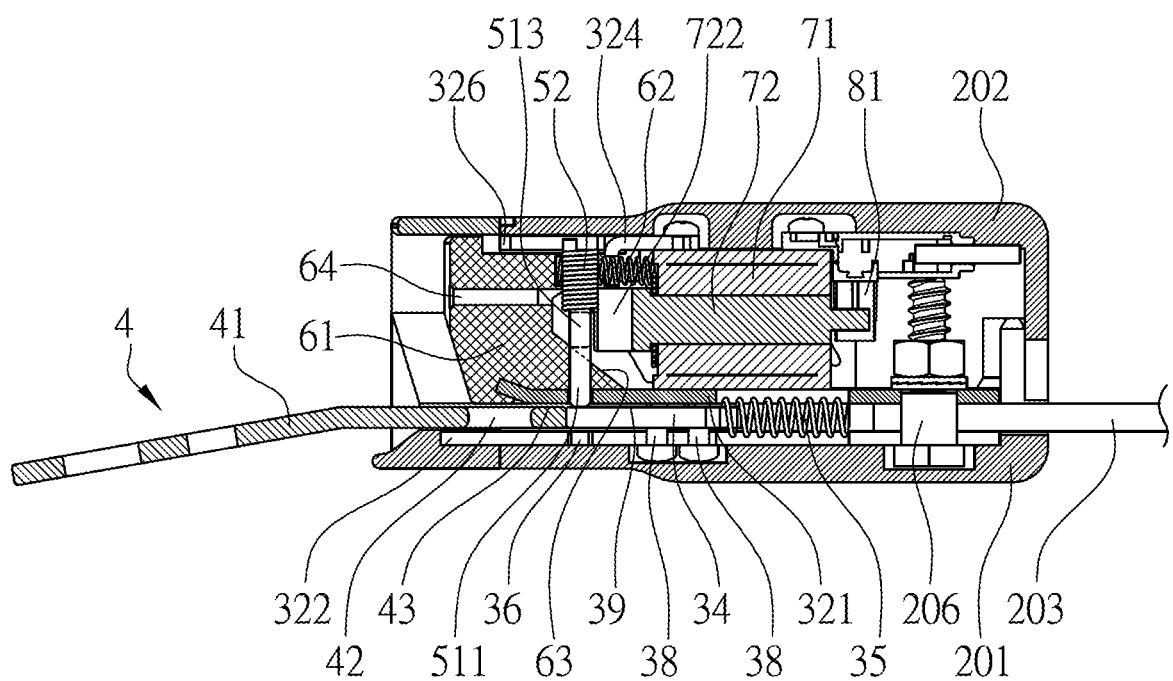
FIG. 12 shows a schematic side view of the electromagnetic unit located at a third position, in which a press unit is pressed to push the bolt body away from the latch unit.

The press body 61 can be shifted between a first position (as shown in FIG. 10) and a second position (as shown in FIG. 12). When the two slider blocks 34 push against the bottom end of the fastening parts 511 of the two bolt bodies 51, the press body 61 is pushed to the first position by the third elastic body 62 and is spaced apart from the wings of the two bolt bodies 51. When the press body 61 is located at the first position, the fastening parts 511 of the two bolt bodies 51 can be pushed into the accommodating space 31.

Referring to FIG. 10, when the two bolt bodies 51 enter the accommodating space 31, the wings 513 of the two bolt bodies 51 abut the two angled support surface 63 on the press body 61, and the press body 61 can be shifted to the second position after being pressed by an external force.

When the press body 61 is shifted from the first position to the second position, the angled support surface 63 of the press body 61 can support the wings 513 of the two bolt bodies 51, so that the fastening parts 511 can be removed from the accommodating space 31.

The position of the plurality of limiting convex bodies 65 is matched with the position of the plurality of stopping portions 326. The plurality of limiting protrusions 65 respectively push against the plurality of stopper portions 326, and the position where the press body 61 moves in the main unit 3 can be confined. The press body 61 and the electromagnetic fixing portion 325 are pushed against by both the sides of the third elastic body 62, and the press body 61 will be pressed to the left. In the embodiment, there are three sets of the limiting convex body 65 and the stopper portion 326, which should not be construed as limiting the invention.

Figure 7:
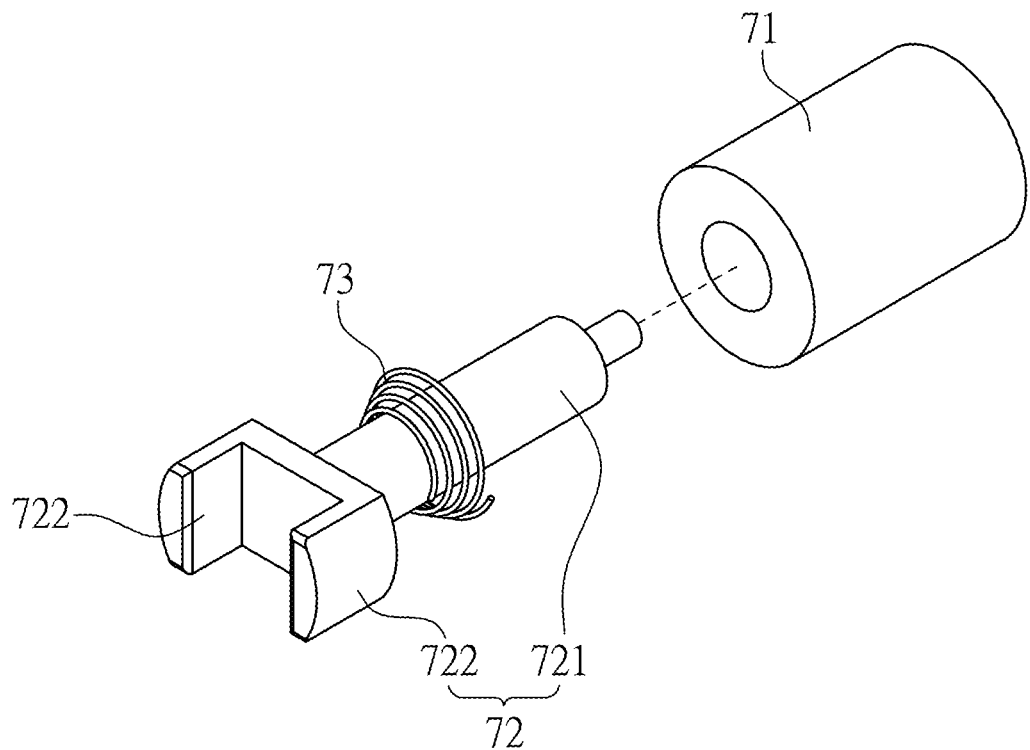
FIG. 7 shows a perspective exploded view of the electromagnetic unit, according to certain embodiments.

Referring to FIG. 7, the electromagnetic unit 7 includes two electromagnetic modules 71, two electromagnetic rods 72 disposed on the two electromagnetic modules 71, and two fourth elastic bodies 73 connected to the two electromagnetic rods 72. The two electromagnetic rods 72 respectively have a magnetic part 721 arranged in the electromagnetic module 71 and two blocking parts 722 connected to the magnetic part 721.

Each of the two electromagnetic modules 71 is an electromagnetic coil structure, and the appearance is like a cylinder with a hole. The two electromagnetic modules 71 are respectively disposed in the two electromagnetic fixing portions 325. The magnetic parts 721 of the two electromagnetic rods 72 are respectively arranged in the hole of the two electromagnetic modules 71, and can be moved by the electromagnetic action of the two electromagnetic modules 71 respectively. Since moving the magnetic attractor by the electromagnetic action is a common technique, it will not be detailed hereinafter.

Figure 11:
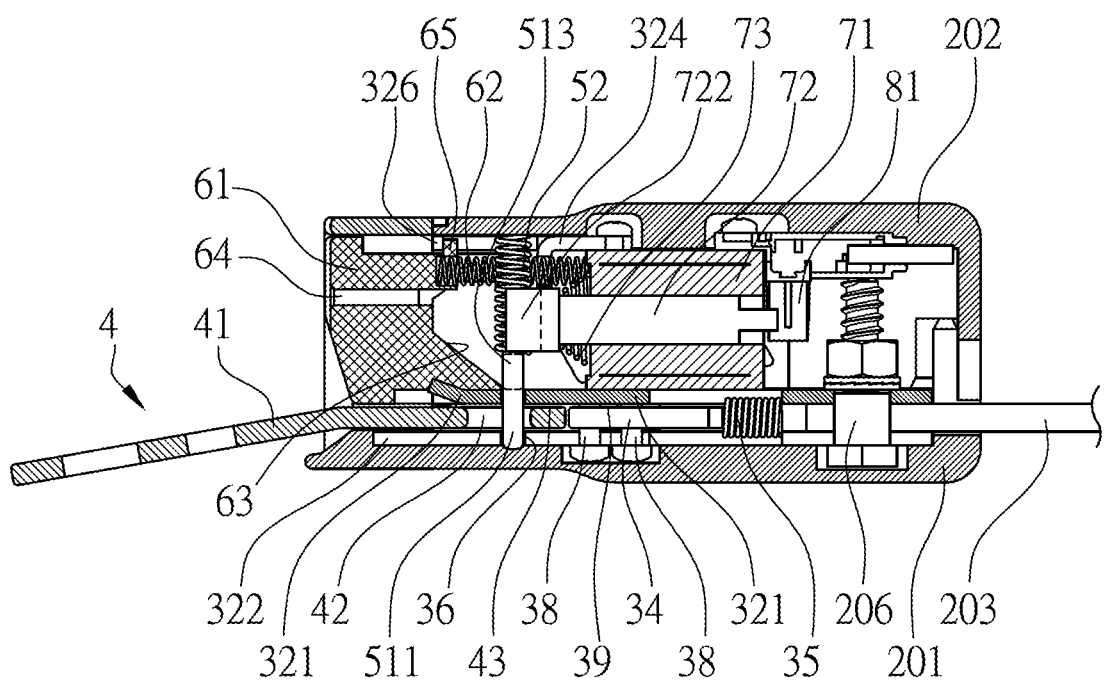
FIG. 11 shows a schematic side view of the electromagnetic unit located at a fourth position and interfering with the bolt body, according to certain embodiments.

The electromagnetic rod 72 can be shifted between a third position (as shown in FIG. 10) and a fourth position (as shown in FIG. 11). When the two electromagnetic modules 71 are excited, the two electromagnetic rods 72 is located at the third position, and the two electromagnetic rods 72 and the two bolt bodies 51 are spaced apart from each other. When the electromagnetic rods 72 is located at the third position, the press body 61 can be shifted to the second position (as shown in FIG. 12), and the two bolt bodies 51 can be removed from the accommodating space 31.

When the two bolt bodies 51 enter the accommodating space 31 and the two electromagnetic modules 71 are not excited, the two electromagnetic rods 72 are pushed by the two fourth elastic bodies 73 respectively to the fourth position. The two electromagnetic rods 72 respectively interfere with the two bolt bodies 51, so that the bolt bodies 51 won't be pushed away from the accommodating space 31 by the press body 61.

Preferably, the two fourth elastic bodies 73 are respectively disposed between the two blocking parts 722 and the electromagnetic modules 71, so that the two electromagnetic rods 72 can be pushed and shifted to the fourth position. The two electromagnetic rods 72 will be shifted to the third position when the two electromagnetic modules 71 are excited.

Figure 8:
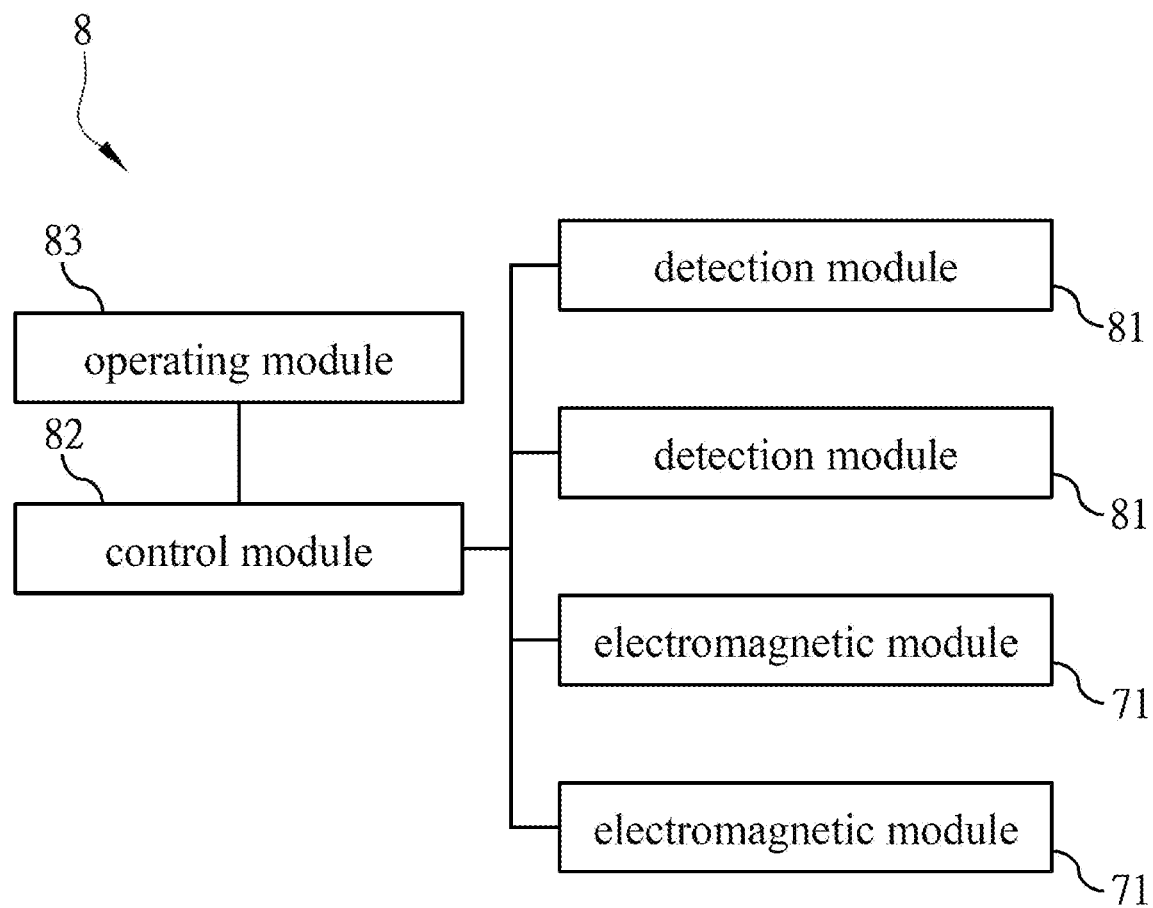
FIG. 8 shows a diagram of the device configuration, in which a control unit and two electromagnetic modules of the electromagnetic unit are disposed, according to certain embodiments.

Referring to FIGS. 3 and 8, the control unit 8 includes two detection modules 81 disposed in the electromagnetic fixing portions 325 of the housing 32 for detecting the position of the two electromagnetic rods 72, and a control module 82 electrically connected to the detection modules 81 and the electromagnetic modules 71, and an operating module 83 electrically connected to the control module 82.

The control module 82 is a microcontroller that can run a program to control the amusement facility. The buckle device is arranged on a seat in the amusement facility. The operating module 83 is an operation panel. Preferably, the operating module 83 is a touch screen, which should not be construed as limiting the invention.

In the embodiment, each of the two detection modules 81 is an infrared detector, which can determine the position of the two electromagnetic rods 72 by detecting whether the infrared ray is blocked or not. For example, when the two electromagnetic modules 71 are excited, the blocking parts 722 of the two electromagnetic rods 72 are far away from the bolt bodies 51. At the same time, the magnetic parts 721 of the two electromagnetic rods 72 will move to the right, and the infrared ray emitted from the two detection modules 81 will be blocked, so that the detection modules 81 can obtain the information that the two electromagnetic rods 72 are located at the third position. When the two electromagnetic modules 71 are not excited, the two electromagnetic rods 72 are pushed by the two fourth elastic bodies 73 to the left, so that the two electromagnetic rods 72 will be far away from the two detection modules 81, and the infrared ray emitted from the two detection modules 81 will not be blocked. Therefore, the control module 82 can obtain information that the two electromagnetic rods 72 are located at the fourth position. In the embodiment, the two detection modules 81 are respectively fastened on the two electromagnetic fixing parts 325 to detect the position of the two electromagnetic rods 72. In actual implementation, this should not be construed as limiting the invention.

The operating module 83 can display the status of the buckle device, and can also control whether the two electromagnetic modules 71 are excited or not. The control module 82 can be connected to multiple buckle devices and can enable the operating module 83 to display the status of the multiple buckle devices.

In the embodiment, two sets of the slider block 34, the fastening unit 5, and the electromagnetic unit 7 are provided. As long as one of the mechanical structures fails, the detection information can be transmitted to the control module 82 by the two detection modules 81, so that the control module 82 can send out a warning signal through the operating module 83 and stop the operation of the amusement device. In actual implementation, the slider block 34, the fastening unit 5, and the electromagnetic unit 7 can be provided in one set, and should not be limited to the exemplary embodiment.

Referring to FIGS. 3 and 4, when the buckle device of the invention is installed, the fastening unit 5 and the press unit 6 can be installed on the first plate 321, and then the fourth plate 324 can be fixed on the two third plates 323 and the electromagnetic fixing portion 325. In this way, the fastening unit 5 and the press unit 6 can be fixed among the first plate 321, the two third plates 323, and the fourth plate 324. Compared with the conventional buckle device with two vertical disks, the buckle device of the invention is relatively simple to install. When the inventor starts to assemble the product, the installation time of the buckle device with the vertical disk is about 3 to 4 hours, while the installation time of the buckle device of the invention is about 1 to 2 hours. The manufacturing time is significantly shortened, and the output can be increased.

Referring to FIG. 9, when the tongue element 41 of the latch unit 4 didn't enter the accommodating space 31, the first surfaces 39 provided on the two slider blocks 34 are pushed by the two first elastic bodies 35 to the place below the two first apertures 33. The positions of the two slider blocks 34 are confined by the two sliding guide bodies 38, so the two slider blocks 34 will not rush out of the accommodating space 31. At this time, the first surfaces 39 provided on the two slider blocks 34 respectively push against the bottoms of the fastening parts 511 of the two bolt bodies 51, so that the fastening parts 511 of the two bolt bodies 51 will not enter the accommodation space 31.

The press body 61 is pushed to the first position by the third elastic body 62. When the tongue element 41 of the latch unit 4 didn't entered the accommodating space 31, even if the press body 61 is pressed and shifted to the second position, since the fastening parts 511 of the bolt bodies 51 didn't enter the accommodating space 31, the angled support surface 63 cannot contact the wings 513 of the bolt bodies 51, the buckle device will not perform any operation.

The control module 82 supplies power to the electromagnetic modules 71, and the electromagnetic modules 71 is excite to generate magnetic force externally, so that the electromagnetic rods 72 can be pushed to the third position. When the tongue element 41 of the latch unit 4 didn't enter the accommodating space 31, even if the control module 82 cuts off the power supply to the electromagnetic modules 71, the two blocking parts 722 of the electromagnetic modules 71 will be blocked by the two wings 513 of the bolt bodies 51, so the electromagnetic rod 72 cannot move to the fourth position. At this time, the buckle device will not perform any operation, either.

Referring to FIG. 10, when the tongue element 41 of the latch unit 4 is pushed into the accommodating space 31, the two slider blocks 34 are pushed by the tongue element 41 and slide to the right. Since the height of the first surfaces 39 is the same as the height of the second surface 43, the bottom end of the fastening part 511 of the bolt bodies 51 will abut against from the first surfaces 39 to the second surface 43. The two tongue openings 42 will move to the place below the fastening parts 511 of the two bolt bodies 51.

Since the two tongue openings 42 are located below the fastening parts 511 of the two bolt bodies 51, the positions of the two tongue openings 42 correspond to the two first apertures 33, and the fastening parts 511 of the two bolt bodies 51 are not supported by any object. The two bolt bodies 51 are pushed by the two second elastic bodies 52 respectively, so that the fastening parts 511 of the two bolt bodies 51 can enter the two tongue openings 42. In other words, the fastening parts 511 of the two bolt bodies 51 enter the accommodating space 31. At the meantime, the fastening parts 511 of the two bolt bodies 51 interfere with the tongue element 41, so that the tongue element 41 cannot leave the accommodating space 31.

Referring to FIG. 11, the control module 82 decides not to energize the two electromagnetic modules 71, and the two electromagnetic modules 71 will not generate magnetic force, so the two electromagnetic rods 72 are pushed to the left by the two fourth elastic bodies 73 and are shifted to the fourth position.

When the two electromagnetic rods 72 are located at the fourth position, the two blocking parts 722 of the two electromagnetic rods 72 are located above the two wings 513 of the two bolt bodies 51, and the two blocking parts 722 respectively interfere with the two wings 513, so that the two bolt bodies 51 cannot move upward.

Since the two bolt bodies 51 have interfered with the tongue element 41, and the two blocking parts 722 interfere with the two wings 513 respectively, the press body 61 cannot be pressed to the second position by external force. Therefore, the tongue element 41 cannot be removed from the accommodating space 31. In this way, the occupants sitting in the seat can be firmly fixed. In some amusement facilities, the buckle device of the invention can protect the safety of the occupants sitting in the seat. The control module 82 will start the amusement device, only when both the two detection modules 81 confirm that the two electromagnetic rods 72 enter the fourth position, so that the occupants can be securely fixed to the seat.

If the control unit 8 loses power, the control module 82 cannot supply power to the two electromagnetic modules 71, and the occupants sitting in the seat cannot directly unlock the buckle device. At this time, a release object (not shown) can be used to forcibly unlock the buckle device. The release object is inserted through the release hole 64 to push the press body 61 and the two electromagnetic rods 72, so that the press body 61 and the two electromagnetic rods 72 will be pushed at the same time. In this way, the two electromagnetic rods 72 will be shifted from the fourth position to the third position, and the press body 61 will be shifted from the first position to the second position. Furthermore, the two bolt bodies 51 will be moved upward to release the tongue element 41. Since the forced unlocking is a common technique, it will not be detailed hereinafter.

Referring to FIG. 10, when the occupant wants to leave the seat, the control module 82 supplies power to the two electromagnetic modules 71, so that the two electromagnetic modules 71 generate magnetic force, and the magnetic portions 721 of the two electromagnetic rods 72 receive the magnetic force and move the two electromagnetic rods 72 to the third position. In this way, the two blocking parts 722 of the two electromagnetic rods 72 leave the place above the two wings 513 of the two bolt bodies 51, and the two electromagnetic rods 72 did not interfere with the two bolt bodies 51.

Referring to FIG. 12, the press body 61 is pressed by an external force, so the press body 61 is shifted from the first position to the second position. At this time, the two angled support surfaces 63 provided on the press body 61 respectively push against one of the wings 513 of the two bolt bodies 51, and the two bolt bodies 51 are pushed upward. The fastening parts 511 of the two bolt bodies 51 will leave the accommodating space 31 from the two tongue openings 42, so that the two bolt bodies 51 won't interfere with the tongue element 41. The two slider blocks 34 are pushed by the first elastic body 35, and the tongue element 41 is pushed to the left, so that the first surface 39 provided on the two slider blocks 34 will be located below the two first apertures 33.

Referring to FIG. 9, the external force applied on the press body 61 is released, and the press body 61 is pressed by the third elastic body 62 from the second position to the first position. The tongue element 41 can be removed from the accommodating space 31 of the main unit 3 by the occupants. The bolt bodies 51 are pushed by the second elastic body 52 to the accommodating space 31. At this time, the first surface 39 of the main unit 3 pushes against the bottom of the fastening part 511 of the bolt bodies 51 and prevent the bolt body 51 from entering the accommodation space 31.

In the embodiments, in order to simplify the structure, the number of the components like first aperture, slider block, first elastic body, tongue opening, bolt body, second elastic body, second aperture, angled support surface, electromagnetic module, electromagnetic rod, fourth elastic body, detection module and fastening guide body can also be one set, which should not be construed as limiting the invention.

The following advantages can be obtained by the above description:

1. Improving output: The assembling method of the invention is performed by a layer-by-layer stacking arrangement, wherein the setting of the spring is relatively simple, and the structure will not slide. The buckle device can be assembled quickly, and the output of the buckle device can be effectively improved.

2. Preventing from be pressed: When the two electromagnetic rods 72 are located at the fourth position, the two blocking parts 722 of the two electromagnetic rods 72 respectively interfere with the two wings 513 of the two bolt bodies 51, and there will be resistance to prevent the press body 61 from being pressed by an external force.

3. Enhancing structure: In the invention, the two bolt bodies 51 move in a straight up and down manner, and the two fastening guide bodies 53 effectively control the two bolt bodies 51 and provide support strength. Furthermore, the two first apertures 33 and the two second apertures 36 simultaneously push against the fastening part 511 of the bolt body 51. Compared with the conventional rotating structure of the vertical disk, the two bolt bodies 51 can withstand the greater pulling force, so that the latch unit 4 is not easily separated from the accommodating space 31.

In conclusion, the accommodating space 31 having two slider blocks 34 is surrounded and defined by the first plate 321, the second plate 322, and the two third plates 323. The two slider blocks 34 can prevent the two bolt bodies 51 from entering the accommodating space 31. The tongue element 41 can enter the accommodating space 31 and push the two slider blocks 34 to move. Therefore, the fastening parts 511 of the two bolt bodies 51 can extend into the two tongue openings 42, and the two bolt bodies 51 interfere with the tongue element 41 to prevent the tongue element 41 from leaving the accommodating space 31.

Since the two first apertures 33 and the two second apertures 36 cooperate to push against the fastening parts 511 of the two bolt bodies 51, the supporting force of the two bolt bodies 51 applied to the tongue element 41 can be effectively enhanced, and the structural strength of the buckle device can also be improved.

When the fastening parts 511 of the two bolt bodies 51 extend into the two tongue openings 42, the two electromagnetic rods 72 can be shifted from the third position to the fourth position, and the two blocking parts 722 of the two electromagnetic rods 72 can interfere with the two wings 513 of the two bolt bodies 51 respectively. Therefore, the fastening parts 511 of the two bolt bodies 51 can be prevented from leaving the two tongue openings 42 and the press body 61 can be prevented from being maintained at the first position.

When the two electromagnetic rods 72 are shifted to the third position, the press body 61 can be pressed by an external force and shifted from the first position to the second position. The two angled support surfaces 63 can push against the wings 513 of the two bolt bodies 51, and allow the fastening parts 511 of the two bolt bodies 51 to leave the two tongue openings 42, so that the tongue element 41 can be released from the interference caused by the two bolt bodies 51. The two slider blocks 34 and the tongue element 41 are further pushed by the two first elastic bodies 35, so that the tongue element 41 can leave the accommodating space 31, and the two slider blocks 34 can be pushed against the fastening part 511 of the bolt body 51. The buckle device can fix the latch unit 4, so the objective of the invention can be obtained.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A buckle device comprising:
    a main body unit, including a housing surrounding and defining an accommodating space, at least one first aperture provided in the housing, at least one slider block arranged in the accommodating space, and at least one first elastic body abutting against the slider block;
    a latch unit, including a tongue element detachably arranged in the accommodating space and detachably abutting against the slider block, and at least one tongue opening provided on the tongue element;
    a fastening unit, including at least one bolt body passing through the first aperture, and at least one second elastic body abutting against the bolt body; and
    an electromagnetic unit that includes at least one electromagnetic module disposed in the housing, at least one electromagnetic rod passing through the electromagnetic module, and at least one fourth elastic body abutting against the electromagnetic rod, wherein the electromagnetic rod is shifted between a third position and a fourth position, the electromagnetic rod is located at the third position when the electromagnetic module is excited, so that the electromagnetic rod is spaced apart from the bolt body, when the bolt body enters the accommodating space and the electromagnetic module is not excited, the electromagnetic rod is pushed by the fourth elastic body to the fourth position, and the electromagnetic rod interferes with the bolt body to prevent the bolt body from leaving the accommodating space;
    wherein when the tongue element is separated from the slider block, the slider block is pushed by the first elastic body, so that the bolt body is pushed against by the slider block, and the bolt body is prevented from entering the accommodating space;
    wherein when the tongue element is in contact with the slider block, the slider block is pushed by tongue element, and the bolt body is pushed by the second elastic body to enter the tongue opening, so that the tongue element is securely fastened.

2. The buckle device as claimed in claim 1, wherein the main unit further includes at least one second aperture provided in the housing and spaced apart from the first aperture, and when the bolt body is pushed into the tongue opening by the second elastic body, the bolt body passes through the second aperture.

3. The buckle device as claimed in claim 2, wherein the housing has a first plate, a second plate spaced apart from the first plate, and two third plates spaced apart from each other and connected to the first plate and the second plate, the first plate, the second plate, and the two third plates cooperate to define the accommodating space, the first aperture is provided on the first plate, and the second aperture is provided on the second plate.

4. The buckle device as claimed in claim 3, wherein the distance between the first plate and the second plate fits in with the thickness of the tongue element and the slider block, so that the first plate and the second plate are able to clamp the tongue element and the slider block, the tongue element and the slider block are able to slide stably in the accommodating space, and the bolt body is pressed against by the tongue element and one of the slider blocks to prevent the bolt body from entering the accommodating space.

5. The buckle device as claimed in claim 1, further comprises a press unit that includes a press body provided in the housing, and a third elastic body abutting against the press body, wherein the press body is shifted between a first position and a second position, when the bolt body is pushed against by the slider block, the press body is pushed by the third elastic body to the first position and is spaced apart from the bolt body, when the bolt body enters the tongue opening, the bolt body is connected to the press body, and the press body is shifted to the second position when being pressed, so that the bolt body is able to move.

6. The buckle device as claimed in claim 5, wherein the press unit further includes at least one angled support surface disposed on the press body, when the bolt body enters the accommodating space, the bolt body is connected to the angled support surface, when the press body is pressed, the press body is shifted from the first position to the second position, and the bolt body is removed from the tongue opening by the angled support surface.

7. The buckle device as claimed in claim 1, further comprises a control unit that includes at least one detection module disposed in the housing for detecting the position of the electromagnetic rod, and a control module electrically connected to the detection module and the electromagnetic module.

8. The buckle device as claimed in claim 1, wherein the fastening unit further includes at least one fastening guide body connected to the bolt body, the fastening guide body has two side walls connected to the housing, two guiding parts respectively arranged on the two side walls, and a top wall connected to the two side walls.

9. The buckle device as claimed in claim 8, wherein the bolt body has a fastening part arranged in the first aperture and capable of extending into the accommodating space, a protruding part connected to the fastening part, and two wings separately arranged on both sides of the protruding part and separately passing through the wings of the two guiding parts.

\* \* \* \* \*